Patented June 22, 1943

2,322,674

UNITED STATES PATENT OFFICE 2,322,674

DRESSING OF EARTH MINERALS

Samuel Benson Thomas, Berkeley, Calif., assignor to Shell Development Company, San Francisco, Calif., a corporation of Delaware No Drawing. Application November 30, 1940, Serial No. 367,957

4 Claims. (Cl. 252—273)

The present invention relates to an improved method for the dressing of earth minerals. More particularly, the invention relates to a method for the classification of earth minerals into grades of various iron content. Particular aspects of the invention relate to the preparation of activated earths, and the preparation of low-iron earth minerals suited for special uses such as the preparation of catalytic contact materials and the like.

The "natural earth minerals," by which term is meant the naturally-occurring earths and earthy minerals of non-metallic luster, occur as residual, alteration and secondary deposits usually contaminated by an appreciable quantity of impurities such, in particular, as iron, titania, silica, etc. For nearly all applications of these earth minerals, iron impurities are very injurious and the quality of the material is largely dependent upon the content of these impurities. There are a few deposits of these earth minerals which are relatively free of these impurities. These deposits are currently mined and yield substantially the total domestic production. There are, however, a large number of deposits of the earth minerals which do not meet the usual specifications and cannot be profitably worked without some sort of a concentration process. In some cases where the impurities are segregated and of sufficiently different properties, certain concentration methods such as log-washing, screening, gravity separation, flotation and the like may sometimes be employed. Since, however, in the case of the mineral earths the prevalent impurities are usually oxides and silicates having approximately the same densities and other physical characteristics of the earth mineral, these various concentration methods are not usually applicable. Thus, for example, it is known that there are many sizable and accessible deposits of bauxite which fall short of meeting the usual specifications. Various attempts have been made to reduce the impurities in these bauxites to within the usual specification limits by log-washing, screening, etc. Such concentration methods have been partially successful in that they were used with these off-grade bauxites to a certain extent during the World War. The working of these deposits, however, has been discontinued and approximately half of the total domestic consumption of bauxite in the last few years has been imported. See, for example, U. S. Bureau of Mines Bulletin No. 312. In all such cases where these more common concentration methods such as log-washing, screening, gravity separation, and the like are uneconomical or inefficient, it is necessary to mine only the few better deposits where the impurities are present only in small amounts or occur in veins, lenses, etc., so that selective mining may be resorted to.

Whether or not a particular earth or earth mineral of a satisfactory grade may be profitably recovered from any particular deposit depends upon the use for which the mineral is intended, since the requirements regarding impurities, and especially iron, vary considerably for different purposes. Thus, for example, in the case of bauxite the main use by far is in the production of aluminum, and for this purpose a bauxite is usually considered of passable grade when its iron content is below about 10%. Consequently, the bauxite mines are usually operated to produce a material meeting this specification. There are, however, many important industries where relatively small quantities of these earth minerals of a much greater degree of purity are desired. Particular examples of such uses are, for instance, in the production of activated earths, in the production of catalytic contact agents, etc. For these purposes, iron impurities are in general very deleterious. In order to supply materials for these special purposes, it is generally the practice to segregate relatively pure material from high grade pockets, lenses and/or hand-sorted ores. These materials are therefore considered specialties and command considerably higher prices than materials of the more usual specifications. Even by these methods the products commonly designated "low-iron" often contain appreciable quantities of iron such, for instance, 2% to 5% as $Fe_2O_3$. There are, it is known, certain more costly methods available for the removal of iron impurities from such earth minerals which are not suitable or economical for the production of large quantities of concentrates of the usual specification, but which can be used in the production of smaller quantities of "low-iron" concentrates intended for certain purposes. As examples of methods of this latter class of treatments may be mentioned the treatment of adsorptive earths with a basic solution of aluminum chloride according to the method of U. S. Patent No. 1,585,826, and the removal of iron from certain minerals by dissolution with certain acids, etc. See, for example, British Patent No. 386,151 and German Patent No. 570,015. These methods, while suitable for preparing earth minerals for certain purposes, are unsuited for others. Thus, in the preparation of earth minerals for use in preparing activated earths, catalytic contact agents and the like, the natural form, strength, etc., of the mineral is highly desirable. Thus, since it is desired to employ the mineral in the form of fragments of, for example, 2-20 mesh, and since to pellet the material is costly and in addition produces a product of inferior mechanical strength, treatments requiring fine grinding of the mineral are usually unsuited. Also, processes involving excessive leaching of the material are usually unsuited for these purposes since such treatments destroy the fine pores and materially impair the mechanical strength.

In view of the above-described circumstances it is apparent that there is a great demand for an economical process whereby the large quantities of off-grade earth minerals may be purified to meet the usual specifications. It is also apparent that there is a demand for a process whereby relatively pure earth minerals suited for many special purposes may be economically recovered from earth minerals of the usual run-of-the-mine purity. These demands, as far as iron and associated impurities are concerned, are fulfilled, at least to a substantial extent, by the process of the present invention.

An object of th invention is to provide a method whereby earth minerals of low-iron content may be recovered in an efficient and economical manner. A further object of the invention is to provide a method whereby iron-containing earth minerals may be classified into grades of various iron content, including a grade of unusually low-iron content. It is furthermore an object of the invention to provide a method whereby natural earth minerals may be de-ironed in a practical and inexpensive manner while preserving the structure, mechanical strength, and other desirable characteristics of the mineral. Still a further object of the invention is to provide a method for the production of low-iron earth mineral concentrates especially suited for the preparation of activated earths, catalytic contact agents and the like.

The process of the present invention is primarily adapted for application with ordinary or specification-grade earth minerals. It may, of course, also be applied to minerals containing higher concentrations of iron impurities. It is usually appliable for the treatment of the common earth minerals having a non-metallic luster. Examples of such minerals are bauxite, diaspore, gibbsite, kaolinite, bentonite, montmorillonite, actinolite, andalusite, sillimanite, colemanite, fuller's earth, diatomaceous earth, etc. Although the method can be applied to such earth minerals, generally it is more advantageous for such of these minerals as are used for contact or adsorptive agents and when intended for such uses. Thus, the process is especially adapted for the preparation of activated bauxites, activated clays, etc.

Like all such methods for the treatment of minerals, the method of the present invention is more advantageous for the treatment of minerals from some deposits than from others. Thus, whereas the bauxites from certain larger well-known deposits of Arkansas, Georgia, Alabama and Tennessee may be efficiently treated by the present method, bauxites of certain other deposits may be unsuited. The factor governing the suitability of such mineral earths for the present treatment appears to be primarily the type and distribution of the iron impurities. It is found that in many of the minerals a large part, or even the whole, of the iron exists in a lower state of oxidation than ferric iron. This appears to be especially true in such of these minerals as are found in association with limestone and/or dolomite. In general, the greater the proportion of iron existing in these lower valence states the more amenable is the mineral to the present treatment. Iron impurities existing in these minerals as insoluble iron silicates, hematite and limonite are not usually removed by the preferred embodiment of the present invention but may be removed by the application of an additional treating step. Although at first sight this may appear as detracting from the desirability of the method, it is not really so since iron in the form of iron silicates and the like is usually present in only small amounts, and, furthermore, is of little or no detriment in most of the intended applications of such minerals; and ferric oxide impurities, if present in appreciable concentrations, can be removed either by modification of the present process or by other known processes.

The distribution of the iron is also important. In earth minerals from some deposits the iron impurities are more intimately associated (more evenly distributed) throughout the mineral than in others. In general, the more spotty or localized the iron impurities exist, the more amenable are the minerals to the present treatment. In most of the minerals of this type the iron impurities are more or less centrally localized in small spots or blotches. Such minerals may be most advantageously treated. It is to be noted, however, that this localization of these iron impurities in small spots or blotches is usually not readily apparent in these minerals. This is partly due to the fact that the iron usually exists in largely lower valence forms as compounds which are relatively light-colored. If the mineral is heated in an oxidizing flame, however, the iron is converted to $Fe_2O_3$, and these spots become more readily apparent.

According to the process of the present invention, the mineral to be treated is first crushed or ground to particles of the desired mesh. In general, the more finely divided is the material treated, the more efficient are the subsequent steps. When processing most minerals, however, the present process does not require pulverizing or grinding, and fragments of, for example, 2-20 mesh are quite suitable. As pointed out above, grinding or pulverizing is usually both expensive and undesirable in the finished product. The fact that fragments of the desired size may be treated without pulverizing is therefore a distinct advantage in the process. The crushed mineral is then activated under mild oxidizing conditions. The purposes of this treatment are two-fold: (1) to remove excess water and clear the fine pores, and (2) to convert the lower-valent iron impurities into magnetite. It will be apparent that the efficiency of (2) is dependent upon the efficiency of (1). Since two things are accomplished simultaneously the condition of the activation (calcination) treatment must be regulated to satisfy both. I have found that this may be easily effected. The temperature, for example, may be varied from about 250° C. to about 500° C.; the time of treatment will vary according to the temperature and will be that required to give maximum activation or somewhat longer, if desired (for some purposes calcination to a point somewhat beyond the maximum activity is desired). In the preparation of adsorbents or materials destined for use in preparing catalytic contact materials, however, care is taken not to over-calcine or deadburn the material. The only other factor of primary importance is the oxidizing ability (potential) of the atmosphere in contact with the material during activation. I have found that a suitable mildly oxidizing atmosphere may be maintained under the above conditions by excluding free access of air and providing a small amount of steam or $CO_2$. In many cases the free and combined water removed from the mineral is sufficient to provide a desired concentration of steam. In such cases the mineral may simply be charged to a kiln, closed except for a small outlet for vapors, and externally heated. In other cases, the desired amount of steam or water may be added. Also, if desired, the material may be activated in an internally fired kiln. In such cases, however, care must be exercised in controlling the combustion to provide only a weakly oxidizing atmosphere. If the calcination is effected in an atmosphere which is too highly oxidizing, the iron impurities are converted to $Fe_2O_3$. Under proper conditions the lower-valent iron impurities are converted into magnetite ($Fe_3O_4$). The conditions necessary for this oxidation are well-known, (see, for example, U. S. Bureau of Mines Bulletin No. 296), and require no further instructions. The activation may be effected in a rotary drum or kiln, or by any other known means.

After the activation treatment the material is subjected to a magnetic separation, for instance, by passing the material through a magnetic separator or a series of magnetic separators of different strengths. Suitable magnetic separators are, for instance, those manufactured and sold in great numbers by the Dings Magnetic Separator Company. By subjecting the material to a magnetic separation the mineral separates into a high-grade low-iron non-magnetic concentrate and a low-grade high-iron magnetic concentrate. If a series of magnetic separators of increasing magnetic strength are employed, a series of concentrates of various iron contents may be obtained. It is particularly noted that the treatment does not remove the iron per se from the material but rather separates the material into fractions of different iron content. Thus, unless the iron impurities are so evenly distributed that all the fragments have essentially the same composition, the process is equally as applicable to minerals containing 1% iron as it is to materials containing much larger quantities. For example, one may treat a high-grade bauxite such as obtained from the mines of the Attapulgas Clay Company in Arkansas. This material, crushed to about 4-8 mesh, is very light-colored and pure-looking but contains about 6% to 7% iron. When calcined with the exclusion of air under mildly oxidizing conditions in a rotating steel drum at a temperature of about 310° C. for a time of about three hours, allowing the exit of steam generated from the combined water, dark stains appear and it becomes somewhat mottled in appearance. The calcined (activated) material may be magnetically separated into a low-iron concentrate consisting of 85% of the total and containing less than 1% iron, and a high-iron concentrate consisting of 15% of the total and containing 35% of iron. The low-iron fraction so obtained, in addition to being of much lower iron content than could be obtained from this bauxite by ordinary methods, is efficiently activated and is an ideal material for the preparation of catalytic contact agents.

According to a preferred embodiment of the invention, the method as above described is considerably improved in efficiency by subjecting the crushed mineral prior to the calcination to an opening treatment. By an opening treatment I mean a treatment designed to open up fine pores in the mineral, for example, by treatment with a chemical agent capable of attacking or dissolving some part or impurity in the mineral. Such treatments are commonly employed to increase the adsorptive ability of activated earths and the like. Suitable agents for such opening treatments are, for example, HCl, $H_2SO_4$, $SO_3$, $COCl_2$, HF, NaOH, etc. The opening-up treatment may be effected with an aqueous solution of the desired agent or, if the agent is volatile such as HCl, HF, $COCl_2$, etc., it may be effected by passing the vapors through a bed of the mineral fragments. The opening treatment may be effected at either normal or elevated temperatures. After the treatment with the opening agent such as HCl, HF, $H_2SO_4$ or the like, the mineral is often washed with water to remove soluble salts, remaining treating agent, etc. As noted above, certain of the agents which are suitably used to open the mineral have been used for the removal of iron impurities from such minerals. When using these agents for this latter purpose the treatments are quite drastic and the iron is removed either by dissolution or by volatilization of the chloride. The treatments employed in the present process differ from these treatments in that they are designed to open the mineral. They are usually considerably less drastic and any iron removed in these treatments is relatively small and incidental. By first subjecting the mineral to a suitable opening treatment, fine pores are opened in the mineral. This allows better access of the mild oxidizing atmosphere to the ferrous impurities during the activation step and increases the efficiency of the separation.

I claim as my invention:

1. In a process for the preparation of activated bauxite from natural bauxite ores containing ferrous iron impurities, the improvement which comprises activating the iron-containing bauxite ore at a temperature from about 250° C. to 500° C. in an atmosphere of steam sufficiently oxidizing to convert ferrous compounds to magnetite, but insufficiently oxidizing to oxidize magnetite to ferric oxide, to convert ferrous iron impurities predominantly to magnetite, to reduce the water content of the bauxite to that corresponding to the maximum adsorptive activity, and subjecting the bauxite activated in this manner to a magnetic separation, whereby there is obtained an activated bauxite concentrate relative free of iron and an activated bauxite concentrate high in iron.

2. In a process for the preparation of activated bauxite from natural bauxite ores containing ferrous iron impurities, the improvement which comprises activating the iron-containing bauxite ore at a temperature from about 250° C. to 500° C. in an atmosphere of steam sufficiently oxidizing to convert ferrous compounds to magnetite, but insufficiently oxidizing to oxidize magnetite to ferric oxide, to convert ferrous iron impurities predominantly to magnetite, to reduce the water content of the bauxite, and to activate the bauxite, and subjecting the bauxite activated in this manner to a magnetic separation, whereby there is obtained an activated bauxite concentrate relatively free of iron and an activated bauxite concentrate high in iron.

3. In a process for the preparation of low-iron bauxites from bauxite minerals containing ferrous iron impurities, the improvement which comprises subjecting the bauxite to an opening treatment with a mineral acid and then activating the opened bauxite at a temperature from about 250° C. to 500° C. in an atmosphere of steam sufficiently oxidizing to convert ferrous compounds to magnetite, but insufficiently oxidizing to oxidize magnetite to ferric oxide, to convert ferrous iron impurities predominantly to magnetite, to reduce the water content, and to activate the bauxite, and subjecting the bauxite activated in this manner to a magnetic separation, whereby there is obtained a bauxite concentrate relatively free of iron and a bauxite concentrate high in iron.

4. A method for the classification of aluminum ores into grades of various iron content which comprises calcining an aluminum ore containing ferrous iron impurities at a temperature from about 250° C. to 500° C. in an atmosphere of steam sufficiently oxidizing to convert ferrous compounds to magnetite, but insufficiently oxidizing to oxidize magnetite to ferric oxide, to convert ferrous iron impurities predominantly to magnetite, to reduce the water content, and to activate the aluminum ore, and subjecting the ore activated in this manner to a magnetic separation, whereby there is obtained a concentrate relatively free of iron and a concentrate high in iron.

SAMUEL BENSON THOMAS.